Sept. 11, 1951     A. V. BRIERCLIFFE     2,567,871
BEE FEEDER

Filed Feb. 3, 1947     2 Sheets—Sheet 1

Inventor:
A V. Briercliffe
By: Featherstonhaugh & Co
his Atty's.

Sept. 11, 1951     A. V. BRIERCLIFFE     2,567,871
BEE FEEDER

Filed Feb. 3, 1947                                  2 Sheets—Sheet 2

Inventor:
A. V. Briercliffe
By: Fetherstonhaugh & Co
his Atty's.

Patented Sept. 11, 1951

2,567,871

UNITED STATES PATENT OFFICE 2,567,871

BEE FEEDER

Aylmer V. Briercliffe, Dugald, Manitoba, Canada

Application February 3, 1947, Serial No. 726,121

5 Claims. (Cl. 6—5)

This application is a continuation-in-part of my United States Patent application Ser. No. 679,453, filed on the 26th day of June 1946, now abandoned. The same relates to improvements in bee-feeders, an object of the invention being to provide a device of the character herewithin described which will fit the standard hive-body, which is unique in its characteristic of enabling bees to feed from the natural comb or from pollen substitutes placed in the two feeder compartments, which, as a fall-feeder has capacity for approximately eighteen pounds of feed which may be consumed not only in the fall but through the entire winter, in which the contents of the feeder are maintained always at hive temperature due to the heat from the bees rising into the feeder, and which functions as an insulator during both hot and cold weather and prevents moisture from condensing and warping the lid of the hive-body.

Further objects of the invention consist in its ease of manipulation, in its being theft-proof against food-stealing by robber-bees, ants and other insects, in its simplicity of design and consequent low cost through ease of manufacture.

Further advantages of the present invention flow from its characteristic of enabling the bees to feed according to their natural, comb-cell feeding habits, in the ease with which it may be filled without liability to spilling, and in the fact that the act of filling causes no disturbance of feeding, and consequently no undesirable excitement in the hive.

Further objects of the present invention are to provide a feeder designed to receive two standard, frame-mounted hive-combs laid in spaced and horizontal positions above a brood next in stepped relationship and hereinafter described so that the bees may have complete access to the combs from every part of the hive, and in which the said combs may be positioned or removed without crushing or unduly disturbing the bees in the hive.

A further object of the present invention consists in providing, in a bee feeder, a fast-feeding compartment preferably, but not necessarily, of approximately four pounds capacity into which the bees may enter and ride a float bar while feeding down to the last drop of feed, the said feed bar being designed to prevent its sticking to the bottom of the said compartment or box, or crushing and drowning bees, such design also facilitating the removal of said float-bar from its feed compartment when necessary.

A further object of the present invention consists in the provision of a bee feeder characterized by having two feed compartments one on either side, and provision for two frame-mounted honey-combs in spaced, horizontal, and superposed position therebetween, the foregoing having a total capacity of approximately eighteen pounds of feed (although I do not desire to be limited to such capacity) just above the bee-cluster to provide additional feed to guard against winter starvation.

A further object of the present invention consists in the combination with the bee-feeder herewithin described of a wintering tank and means for supporting the same alternatively to the pair of superimposed and horizontally disposed combs hereinafter described, for the purpose of fast feeding in the late fall to bring light hives up to a standard weight for wintering the bees, the aforesaid tank being designed to hold approximately fourteen pounds of either honey or sugar syrup and so constructed that a pile of the same may be placed one upon the other when not in use.

Further objects of the present invention flowing from its construction and position, reside in its cooperation towards the education of the amateur bee-keeper by enabling him to study the development of bees from the egg-stage to the adult bee, for which purpose a feeder containing two combs of eggs, pollen and brood should be placed over a hive containing a strong colony with a queen-excluder between them when it will be found that frequent inspectional disturbances of the broods may be made without endangering the life of the queen. Under adverse wintering conditions also, from the ease with which my feeder may be inspected, one may readily ascretain if and when more feed is necessary.

A further object of the present invention consists of the co-operation afforded in late fall or early spring in strengthening a weak colony with a special queen which it is desired to keep, which procedure consists in placing my feeder with two feed-laden combs therein over a strong hive of bees with a queen-excluder between them. In a short while the feeder will be well filled with contented bees whereupon the feeder is removed and placed over the hive containing the weak colony. The two should be separated by a paper or inner lid having a small hole in the centre thereof so that the bees will mix slowly and thus avoid fighting, after which it should be taken to an out-apiary or a bee-cellar for approximately ten days so that the bees will forget their former home surroundings. In the case of frames of capped or emerging brood, two of the frames supporting such broods may be placed in my feeder which may then be positioned over a weak colony. As the young bees emerge, they will be readily accepted by the colony and will not return to the hive from whence they were taken since they have not yet had a flight. Thus removal of the weak colony from its existing location is rendered unnecessary.

A further object of the present invention consists in the co-operation afforded thereby in the matter of transference of a queen-cell from one hive to another. Thus, when in the periodical examination of colonies a large and well-formed capped queen-cell is found in a hive that already possesses a prolific queen, such cell need not be destroyed. Instead, the comb containing the same may be laid in my feeder which is then placed over a hive containing a strong colony with a queen-excluder between the two, leaving a top-opening for an entrance so that the queen may be mated. In this way a virile queen is made available for hive increase or replacement.

A furthe robject of the present invention resides in the facility afforded towards the placing of a queen-cage in a favourable position above a row of suspended comb-frames with a minimum disturbance of the colony, the position aforesaid being one in which the queen is kept warm by rising air currents from the bee-colony.

A further object of the present invention re-usefulness as a source of supply of wax for the bees when there is a scarcity of incoming nectar owing to climatic conditions if the bee-keeper exercises the precaution of saving and placing in the keyed boxes or compartments of my feeder the particles of wax scrapings and burr-combs which he finds when examining the hives, which reduces to a certain extent the destruction of combs by the bees in order to build or repair others.

With the foregoing objects in view and such other objects and advantages as will become apparent to those skilled in the art to which this invention relates as this specification proceeds, my invention consists essentially in the arrangement and construction of parts all as hereinafter more particularly described, reference being had to the accompanying drawings, in which.

In the drawings like characters of reference indicate corresponding parts in the different figures.

Figure 1:
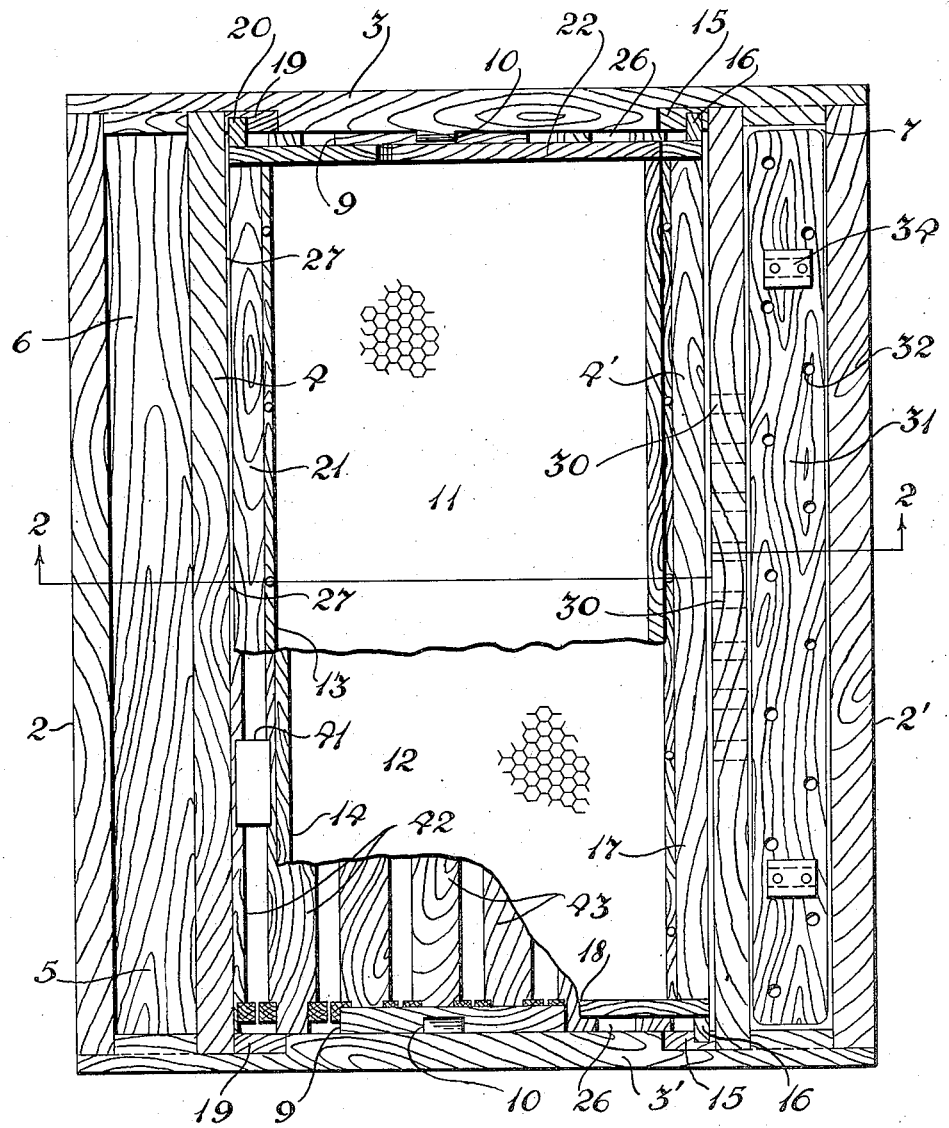
Figure 1 is a plan view of my bee-feeder with certain parts shown in fragmentary form for clarity of exposition.

Many types of bee-feeders have been introduced and commercially tested particularly subsequent to the pioneering developmental activities of A. I. Root and others in the latter part of the eighteenth century. All such feeders, according to my experience suffer from certain disadvantages in the light of present-day knowledge of scientific bee-keeping which in my belief has been overcome by the feeder herein describd.

My invention is designed to overcome the foregoing and other disadvantages as well as introducing a number of unexpected advantages, the majority and most important of which I have hereinabove suggested. A description of my bee-feeder therefore now follows:

A shallow rectangular frame collectively designated 1 is formed of a pair of outer side walls 2, 2', and a pair of end walls 3 and 3'. Spaced within the confines of the foregoing walls and parallel with walls 2 and 2', is a pair of inner walls 4 and 4' with a floor board 5 between each pair of walls 2 and 4, and 2' and 4'. These pairs of walls and the said floor boards accordingly constitute with the portions of the end walls 3 and 3' which cross the ends, feeding compartments or feed boxes 6 and 7 of elongated configuration.

The inner surfaces 8 of those portions of end walls 3 and 3' which lie between inner walls 4 and 4' are similarly recessed and provided with supporting battens and check-blocks 9 and 10 respectively to sustain in position a pair of horizontally disposed and spaced bee-feeding combs 11 and 12 mounted in the conventional comb-frames 13 and 14, or alternatively the wintering tank which will be described hereinafter.

The elongated and vertically disposed recesses 15 are intended to receive trunnion or projecting portions 16 of the top-bar 17 of frame 14 while the side bars 18 of this frame rest on the battens 9. Recesses 19 however are intended to receive the projecting or trunnion portions 20 of the top-bar 21 of frame 13 while the side bars 22 of frame 13 rest on the side bars 18 in the manner clearly illustrated in the accompanying Figure 2. Check-blocks 10 are intended to sustain frames 13 and 14 against endwise movement while in situ as above described.

From the foregoing it will be recognized that frames 13 and 14 are arranged in superposed and step-lapped relationship with the top-bars 17 and 21 projecting and abutting against walls 4' and 4 respectively. By this arrangement it will be clear that bees within the hive-body 23 have freedom to climb through the elongated spaces existing between top and bottom bars 21 and 24, and 17 and 25 as well as up in the transversely extending spaces 26 existing between the frame side-bars 18 and 22 and one or other of the end walls 3 or 3' adjacent thereto.

The inner wall 4 is provided adjacent the upper edge thereof with a plurality of entrance apertures 27 for the bees of which I show three in the accompanying drawings, and communicating with these apertures are vertical passageways 28 communicating at the lower ends thereof with the openings 29. From this arrangement it will be apparent that liquid feed poured into compartment 6 will rise to an equivalent height in the passageways 6 and it is to be understood that the bees enter the apertures 27 and sip the feed in the passageways 28 as the level descends.

The compartment or feed-box 6 is to be understood as the spring-feed compartment while compartment 7 is a fall and winter feeding compartment, it being understood that for wintering purposes both compartments will be filled. Apertures 30 of which, in the accompanying drawings I provide eight, while not desiring to be confined to this number, are formed in wall 4' to provide entrance to compartment 7 adjacent the upper edge of the said wall.

Within compartment 7 I position a float-bar 31 provided with a plurality of apertures 32 through which the bees may sip feed while standing on the aforesaid bar as it lowers with the consumption of feed at the positions best indicated in Figure 1, I provide pairs of metallic studs or feet 33 which may be secured for extra strength to the small blocks 34 so that the bar 31 is held spaced from the floor board 5. Thus, when the box 7 is empty the float-bar will not stick to the floor board but may be readily removed.

It will be seen that the outer side walls and end walls of my feeder rest upon the upper edges 35 of the hive-body 23. It will therefore be perceived that my feeder may be covered with the conventional hive lid 36. For convenience of transportation it will be noted that I have provided recessed hand-grips 37 mid-way upon the length of the side walls 2 and 2', and that the upper edges 38 of these grips are flush with the lower edges 39 of the rim 40 of the aforesaid lid.

Figure 2:
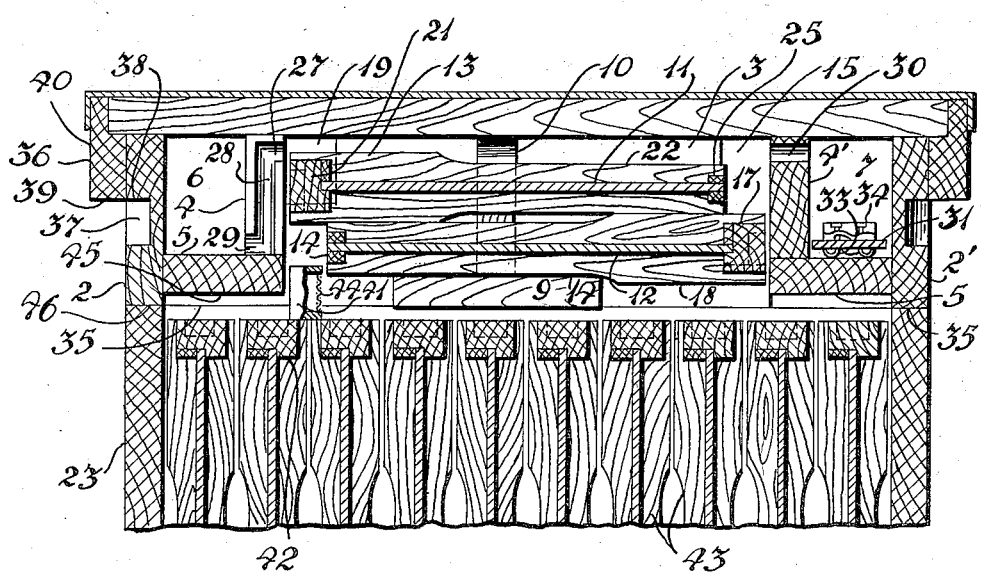
Figure 2 is a section on the line 2—2 of Figure 1.

In the accompanying Figure 2, I have indicated the preferred locus of a queen-cage or box 41, which, as will be seen may be placed upon two adjacent top-bars 42 of the row of comb-frames 43 hanging within the hive-body 23, and which frames, it is to be understood, are similar in all respects to frames 13 and 14. The queen-cage is simply placed in the position indicated between the bottom rail of frame 14, and the adjacent wall 4. In such position it may very easily be introduced by holding between the forefinger and thumb after raising the lid or cover 36 to the minimum extent necessary so that no disturbance need be caused to the colony. The cage is introduced with the screen side 44 facing the centre of the hive in order that the bees may the more easily feed the queen.

It will be noted that the under surfaces 45 of the floor portions 5 are slightly elevated above the plane of the under-rim of my feeder, and such elevation is slightly in excess of the height of the bees which it will be understood crawl upon the under surface 45. By this arrangement, it will be recognised that the bees may readily climb across the top bars of the end-most hanging frames 43 which under-lie the lower portions 5. Additionally, since the under surfaces 45 are elevated with respect to the surrounding edge 46 of my feeder, it will be recognised that when the feeder is taken off and placed upon a flat surface, bees clinging to the under surfaces 45 will not be crushed.

Figure 3:
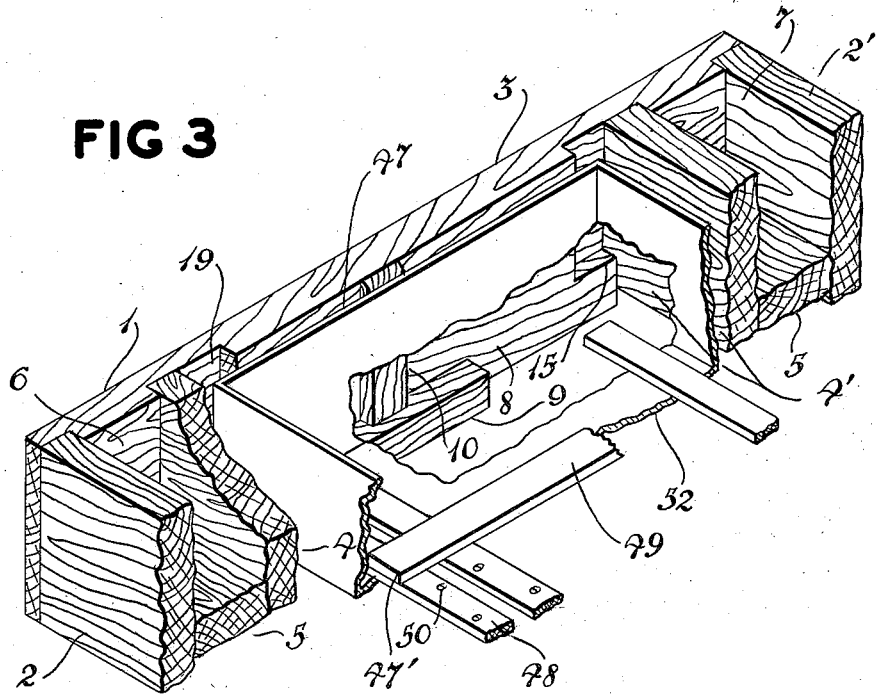
Figure 3 is a fragmentary representation of one end of my bee-feeder and illustrating the manner in which my wintering tank is supported therein alternatively to the pair of super-imposed comb-frames illustrated in Figures 1 and 2.

In the accompanying Figure 3 it will be observed that I have depicted one end of my bee-feeder supporting the wintering tank 47 to which I have already made reference, the same resting on the pair of horizontal end battens 9. This tank is preferably manufactured of galvanized iron and occupies substantially the whole walls 3 and 3', 4 and 4' less a space of about half an inch on all four sides up which the bees may climb in order to enter my tank.

The tank is approximately two and a half inches deep and within it is positioned the float raft 47' composed of the thin, spaced set of longitudinally extending and parallel slats 48, and the pair of transverse tie slats 49, one of which will be secured across the set of members 48 adjacent the opposite end thereof.

A staggered row of apertures 50 is formed in each of the slats 48 through which, and the elongated spaces 51, the bees may sip the honey or sugar while they ride the raft during its subsidence onto the floor 52 of the tank. The under side of the aforesaid raft is provided with a set of the U-shaped cables which I have already designated 43 in relation to the float-bar 31, to prevent the raft from sticking to the tank floor.

By the provision of the aforesaid tray in lieu of the combs 11 and 12, I am able to load up my feeder with approximately 22 pounds of feed which, in the late fall will be consumed by the bees in a very short time. By virtue of its location, the contents of the tank are kept warm by convection currents of warm air from the colony below, and the arrangement aforesaid which I have made to facilitate feeding from my wintering tank 47 is such that the contents thereof may be consumed in a minimum of time and with a minimum of obstruction consistent with the preservation of the bees against drowning.

Finally, in connection with the tray described in the immediately preceding paragraph hereof, I desire to explain that by the use of same I am enabled, if I so desire, to place therein a whole array of queen cages in contrast to the limited number where I have already indicated, when using the comb-frames 11 and 12.

Since various modifications can be made in my invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A bee-feeder designed to overlie the standard hive-body or super, said feeder comprising a shallow open frame, and means on said frame for supporting at least one bee-feeding comb and comb-frame horizontally therewithin for the purpose specified.

2. A bee-feeder designed to overlie the standard hive-body or super, said feeder comprising a shallow open frame, and means on said frame for supporting at least two bee-feeding combs and comb-frames horizontally and in spaced, superposed relationship therewithin with the respective top-bars of said frames parallel but on opposite sides.

3. The device according to claim 2 wherein said frames are in superposed, step-lapped relationship so that said top-bars project and abut the opposite walls of said first mentioned frame as and for the purpose specified.

4. A bee-feeder designed to overlie the standard hive-body or super, said feeder comprising a shallow open frame, and means on said frame for supporting at least two bee-feeding combs and comb-frames horizontally and in spaced, superposed, step-lapped relationship therewithin with the respective top-bars of said frames parallel but on opposing sides and abutting the opposite walls of said first mentioned frame as and for the purpose specified.

5. A bee feeder designed to overlie and register with the standard hive body or super, said feeder comprising a removable, shallow, rectangular open frame, and means on said frame for supporting at least two bee-feeding combs and comb frames horizontally and in spaced, superposed, step-lapped relationship therewith with the top bars of said frames parallel but on opposing sides and abutting the opposite walls of said first-mentioned frame, said means including a pair of elongated and vertically disposed recesses situated at one end of each of the end walls of said first-mentioned frame for receiving the projecting portion of the top bar of the lower of said comb frames, and a further pair of elongated and vertically disposed recesses situated at the opposite ends of each of said end walls of first-mentioned frame for receiving the projecting portions of the top bar of the other of said comb frames, battens extending inwardly from the lower edges of each of said end walls to support the said lower comb frame, and a removable hive lid engageable with the upper perimetrical edges of said first-mentioned frame.

AYLMER V. BRIERCLIFFE.

REFERENCES CITED

The following references are of record in the file of this patent:

UNITED STATES PATENTS

| Number | Name | Date |
|---|---|---|
| 334,914 | Ward | Jan. 26, 1886 |
| 337,097 | Vincent | Mar. 2, 1886 |
| 1,607,659 | Will | Nov. 23, 1926 |
| 2,001,463 | Kehrle | May 14, 1935 |